Jan. 8, 1929.  1,697,843
T. I. ALLEN
HUMIDIFIER FOR HEATING SYSTEMS OF AUTOMOBILES
Filed Dec. 16, 1926
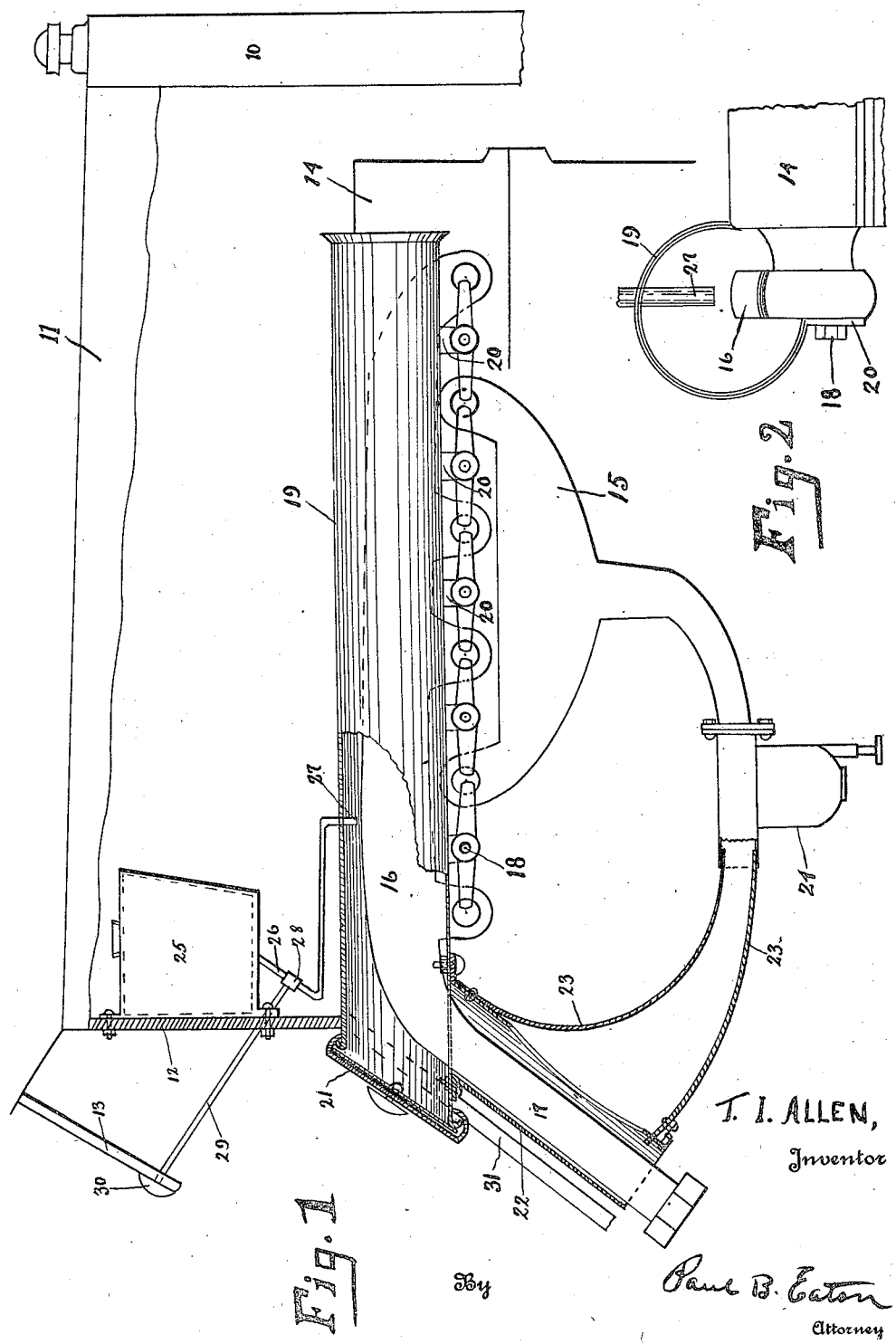
T. I. ALLEN,
Inventor
By Paul B. Eaton
Attorney Patented Jan. 8, 1929.

1,697,843

UNITED STATES PATENT OFFICE.

THOMAS I. ALLEN, OF CHARLOTTE, NORTH CAROLINA.

HUMIDIFIER FOR HEATING SYSTEMS OF AUTOMOBILES.

Application filed December 16, 1926. Serial No. 155,313.

My invention relates to means for supplying moisture to the heating system of an automobile.

Heretofore, it has been customary to heat the interior of automobiles by supplying heated air thereto by means of a heating chamber located around a portion of the exhaust manifold or around a portion of the exhaust pipe. This heated air is conducted to the interior of the automobile by suitable ducts leading from the heating chamber to the interior of the automobile. This heated air is very dry and devoid of humidity and results in headaches, drowsiness, and other ailments to the passengers, caused by this extremely dry heated atmosphere.

An object of my invention is to provide means for humidifying this heated air by causing water to be conveyed from a suitable source of supply to the heating chamber where it is allowed to come in contact with the heated exhaust member of the internal combustion engine.

Some of the objects of the invention having been stated, other objects will appear as the description proceeds.

In the drawings, I have set forth a preferred embodiment of my invention, in which—

Figure 1 is a side elevation of the front end of an automobile equipped with my device, with portions thereof broken away;

Figure 2 is a front end elevation of my device looking towards the rear of the automobile.

A brief description of the drawings having been given, a detailed description will now follow, in which like reference characters indicate corresponding parts throughout the drawings.

The numeral 10 indicates the radiator of an automobile having an internal combustion engine, while the numeral 11 indicates the hood covering the motor with a large portion thereof broken away for the purpose of clearness. The numeral 12 indicates the dashboard of an automobile, while the numeral 13 indicates the instrument board of an automobile. The internal combustion engine is indicated at 14, and the intake manifold is indicated by the numeral 15. The exhaust manifold 16 has the conventional rearwardly projecting exhaust portion 17. Conventional bolts, such as 18, serve to secure the intake and exhaust manifolds to the engine. Secured around the exhaust manifold 16 is the drum 19, which drum is secured in place by projecting lugs 20, being engaged by the bolts 18. The rear end of this metallic drum is closed by a shutter mechanism 21, by means of which the heated air from the drum may be admitted to or excluded from the interior of the automobile. The metallic drum 19 has secured thereto, the tubular portion 22, which tubular portion entirely surrounds the exhaust portion 17 and projecting from the forward portion of this member 22 is the portion 23, which is adapted to draw heated air into the carburetor 24. Mounted at any suitable place, such as to the dashboard 12, is the tank 25, which has a pipe 26 leading from the lower portion thereof, into the interior of the drum 19, and has its end 27 in close proximity to the exhaust manifold 16. Located in this pipe 26 is a suitable valve 28, which has an extended valve stem 29, projecting through the dashboard 12 and also through the instrument board 13 and has the knob 30 on its upper end, by means of which the flow of water through the pipe 26 can be regulated by the occupants of the automobile without the necessity of getting out of the automobile. The floor of the automobile is indicated by the numeral 31.

The drum 19 is open at its forward end, but it is understood that it may be closed or partly closed by a suitable cap, (not shown) fitting thereover.

In the drawings, I have shown the tank located underneath the hood and secured to the dash board, but I desire it to be understood that this tank may be located at any suitable point about the automobile.

I have shown the pipe discharging the water on to the exhaust manifold, it being understood that when my device is used with an automobile in which the heating chamber is located around the exhaust pipe, that that the pipe 26 may be led thereto without departing from the spirit of the invention.

With the water being discharged on the exhaust manifold, as shown in the drawings, not only will the atmosphere within the interior of the automobile be humidified, but also the heated air taken into the carburetor will be laden with moisture, resulting in much better carburetion as it is a well known fact that internal combustion engines perform more efficiently when the atmosphere is laden with moisture.

In the description and drawings I have set forth a preferred embodiment of my invention, and although specific terms are employed, they are used in a generic and descriptive sense only, and not for purposes of limitation, the scope of the invention being set forth in the appended claim.

I claim:

In a heating and humidifying system for the passenger compartments of automobiles, a heating chamber located around the exhaust pipe from an internal combustion engine, a passageway leading from the heating chamber to the interior of an automobile, a tank located above the heating chamber, a pipe leading from the tank to the heating chamber, the end of the pipe being disposed above the exhaust pipe, and adapted to conduct water from the tank to the exhaust pipe, and means located within reach of the driver of the automobile for regulating the flow of water.

In testimony whereof I affix my signature.

THOMAS I. ALLEN.